United States Patent
Lee

(10) Patent No.: US 10,023,732 B2
(45) Date of Patent: Jul. 17, 2018

(54) RIGID IPVC PIPE RESIN COMPOSITION EXHIBITING EXCELLENT STRENGTH AND HYDROSTATIC PRESSURE RESISTANCE AND RIGID IPVC PIPE

(71) Applicants: PPI PYUNGWHA CO., LTD, Hwaseong-si, Gyeonggi-do (KR); PYUNGWHA PIPE INDUSTRY INC., Chicago, IL (US)

(72) Inventor: Jong-Tae Lee, Seoul (KR)

(73) Assignees: PPI PYUNGWHA CO., LTD, Hwaseoung-si (KR); PYUNGWHA PIPE INDUSTRY INC., Chicago, IL (US)

( * ) Notice: Subject to any disclaimer, the term of this patent is extended or adjusted under 35 U.S.C. 154(b) by 267 days.

(21) Appl. No.: 14/394,627

(22) PCT Filed: Jul. 1, 2014

(86) PCT No.: PCT/KR2014/005832
§ 371 (c)(1),
(2) Date: Oct. 15, 2014

(87) PCT Pub. No.: WO2015/016491
PCT Pub. Date: Feb. 5, 2015

(65) Prior Publication Data
US 2016/0046800 A1 Feb. 18, 2016

(30) Foreign Application Priority Data
Jul. 30, 2013 (KR) .................. 10-2013-0090278

(51) Int. Cl.
| | | |
|---|---|---|
| C08L 33/08 | (2006.01) | |
| C08L 27/06 | (2006.01) | |
| F16L 9/127 | (2006.01) | |
| F16L 9/12 | (2006.01) | |
| C08K 5/101 | (2006.01) | |
| C08K 5/57 | (2006.01) | |
| C08L 33/06 | (2006.01) | |
| C08L 51/00 | (2006.01) | |

(52) U.S. Cl.
CPC .............. *C08L 27/06* (2013.01); *C08K 5/101* (2013.01); *C08K 5/57* (2013.01); *C08L 33/06* (2013.01); *C08L 51/003* (2013.01); *F16L 9/12* (2013.01); *F16L 9/127* (2013.01)

(58) Field of Classification Search
CPC .. C08K 5/10; C08K 5/372; C08K 5/57; C08L 27/06; C08L 33/06

USPC ................................................ 428/34.7, 35.1
See application file for complete search history.

(56) References Cited

U.S. PATENT DOCUMENTS

| | | | |
|---|---|---|---|
| 3,936,417 A | 2/1976 | Ronden | |
| 3,978,022 A | 8/1976 | Carson, Jr. | |
| 4,239,679 A * | 12/1980 | Rolls ...................... | C08J 3/203 |
| | | | 524/425 |
| 5,314,965 A * | 5/1994 | Kishida ................. | C08F 285/00 |
| | | | 525/199 |
| 2008/0139713 A1* | 6/2008 | Lee ......................... | C08K 5/12 |
| | | | 524/139 |
| 2008/0161470 A1* | 7/2008 | Feinberg ................ | C08L 27/06 |
| | | | 524/425 |
| 2008/0242802 A1 | 10/2008 | Noguchi et al. | |

FOREIGN PATENT DOCUMENTS

| | | |
|---|---|---|
| DE | 3608661 A1 | 12/1986 |
| EP | 1698657 A1 | 9/2006 |
| GB | 1090670 A | 11/1967 |
| JP | 57139135 A | 8/1982 |
| JP | 08003402 A | 1/1996 |
| JP | 10017626 A | 1/1998 |
| JP | 11106438 A | 4/1999 |
| JP | 2003089737 A | 3/2003 |
| JP | 2005155901 A | 6/2005 |
| KR | 100210436 B1 | 7/1999 |
| KR | 100909183 B1 | 7/2009 |
| KR | 101266515 B1 | 5/2013 |
| RU | 2275383 C1 | 4/2006 |

OTHER PUBLICATIONS

Hiroshi Matsumoto, "Rigid IPVC pipe resin composition exhibiting excellent strength and hydrostatic pressure resistance and rigid IPVC pipe", JIS handbook Plastic II (Material), Japanese Standards Association, Feb. 16, 2016, first edition, 22 pages.
Japanese Office Action dated Feb. 16, 2016 corresponding to Japanese Application No. 2015-529710.
Russian Office Action dated Apr. 26, 2016 corresponding to Russian Application No. 2015101341/05.
European Search Report dated Jul. 22, 2015 in connection with the counterpart European Patent Application No. 14831557.5.
International Search Report and Written Opinion for PCT/KR2014/005832 dated Oct. 1, 2014.

* cited by examiner

*Primary Examiner* — Ellen S Wood
(74) *Attorney, Agent, or Firm* — Hauptman Ham, LLP

(57) ABSTRACT

Provided are: a rigid IPVC pipe resin composition, which exhibits excellent strength and hydrostatic pressure resistance, including a PVC resin having a K-value from 72 to 84; and a rigid IPVC pipe, which exhibits excellent strength and hydrostatic pressure resistance, manufactured by extrusion of the resin composition.

7 Claims, No Drawings

RIGID IPVC PIPE RESIN COMPOSITION EXHIBITING EXCELLENT STRENGTH AND HYDROSTATIC PRESSURE RESISTANCE AND RIGID IPVC PIPE

CROSS REFERENCE TO RELATED APPLICATION

This application claims the priority of Korean Patent Application No. 10-2013-0090278 filed on Jul. 30, 2013 in the Korean Patent and Trademark Office. Further, this application is the National Phase application of International Application No. PCT/KR2014/005832 filed on Jul. 1, 2014, which is incorporated herein by reference in its entirety.

TECHNICAL FIELD

The present invention relates to a rigid impact PVC (IPVC) pipe resin composition exhibiting excellent strength and hydrostatic pressure resistance, and a rigid IPVC pipe.

BACKGROUND ART

Generally, PVC pipes refer to pipes produced by extrusion of a polyvinyl chloride resin.

Since PVC pipes are light and low cost, have long lifespan, and exhibit excellent mechanical properties, chemical resistance, corrosion resistance, medicine resistance, heat insulation, electrical insulation and the like, PVC pipes are widely used in the art.

However, when PVC pipes are used for engineering and construction materials, the PVC pipes can suffer from problems such as breakage, bursting and the like during use and handling thereof due to a limit in impact and tensile strength. Such problems are caused by inversely proportional relationship between impact strength and tensile strength, that is, a phenomenon in which the PVC pipe exhibits lower tensile strength with increasing impact strength thereof and exhibits lower impact strength with increasing tensile strength thereof.

Therefore, there is a need for a resin composition for PVC pipe molding, which exhibits simultaneously improved impact strength and tensile strength while exhibiting improved hydrostatic pressure resistance.

DISCLOSURE

Technical Problem

It is an aspect of the present invention to provide an IPVC pipe resin composition which includes a PVC resin having a K-value from 72 to 84 without use of a plasticizer and can realize mechanical properties by extrusion of the composition.

It is another aspect of the present invention to provide a rigid PVC pipe which is produced by extrusion of the IPVC pipe resin composition as set forth above, exhibits excellent tensile strength, falling weight impact strength and hydrostatic pressure resistance, and can be used as a pipe for engineering, construction, water supply and sewage.

Technical Solution

In accordance with one aspect of the present invention, a rigid IPVC pipe resin composition exhibiting excellent strength and hydrostatic pressure resistance includes a PVC resin having a K-value from 72 to 84.

The rigid IPVC pipe resin composition exhibiting excellent strength and hydrostatic pressure resistance includes: about 1 part by weight to about 3 parts by weight of a tin stabilizer (tin complex); about 3 parts by weight to about 10 parts by weight of an impact modifier; and about 1 part by weight to about 10 parts by weight of a methacrylate lubricant, based on 100 parts by weight of the PVC resin having a K-value from 72 to 84.

The methacrylate lubricant may include butyl methacrylate and methyl methacrylate.

The methacrylate lubricant may include butyl methacrylate and methyl methacrylate in a weight ratio of about 1:1 to about 1:2.

In accordance with another aspect of the present invention, a rigid IPVC pipe exhibiting excellent strength and hydrostatic pressure resistance is produced by extrusion of a resin composition.

The pipe may have a tensile strength from about 50 MPa to about 60 MPa.

Advantageous Effects

The PVC pipe produced by extrusion of the IPVC pipe resin composition can realize excellent tensile strength, falling weight impact strength and hydrostatic pressure resistance.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Rigid IPVC Pipe Resin Composition

In accordance with one aspect of the present invention, a rigid IPVC pipe resin composition exhibiting excellent strength and hydrostatic pressure resistance includes a PVC resin having a K-value from 72 to 84.

Typically, most PVC pipes are produced by extrusion of a rigid PVC resin, and most rigid PVC pipes are produced by extrusion of a PVC resin having a K-value of 66. On the other hand, since the PVC resin having a K-value from 72 to 84 cannot be subjected to rigid extrusion, the PVC resin having a K-value from 72 to 84 is subjected to extrusion by mixing a large amount of a plasticizer therewith, and thus produced into soft extruded products such as sheets, vinyl, and the like.

Specifically, even though the PVC resin having a K-value from 72 to 84 exhibits superior mechanical properties to the PVC resin having a K-value of 66 and thus can be produced into a higher-impact PVC pipe, there are drawbacks in that the PVC resin having a K-value from 72 to 84 has a relatively high melting point due to a high molecular weight thereof, requires high temperatures upon processing thereof, and exhibits poor melt flowability due to high viscosity thereof. Thus, since it is understood that the PVC resin having a K-value from 72 to 84 imposes high load on an extruder upon extrusion thereof and thus cannot be subjected to rigid extrusion, the PVC resin having a K-value from 72 to 84 is produced into soft extruded products such as sheets, vinyl and the like by mixing a large amount of the plasticizer therewith in most cases.

Here, the plasticizer includes phthalic acid plasticizers (DOP, DEHP, DINP, DBP, and the like), adipic acid plasticizers (adipates, DHEA, and the like), and the like.

However, when the PVC resin having a K-value from 72 to 84 is mixed with a large amount of the plasticizer and then produced into a pipe by extrusion, there is a problem in that the pipe can suffer from deterioration in various mechanical properties.

Therefore, the rigid IPVC pipe resin composition includes the PVC resin having a K-value from 72 to 84 and a methacrylate lubricant, thereby realizing both excellent strength and hydrostatic pressure resistance through efficient extrusion. Thus, even though the PVC resin having a K-value from 72 to 84 is used, the rigid IPVC pipe resin composition can be produced into rigid extruded products and exhibits improved mechanical properties due to use of no plasticizers.

The PVC pipe resin composition includes the PVC resin having a K-value from 72 to 84 as a base resin, and the PVC resin having a K-value from 72 to 84 can be used for engineering and construction materials due to excellent mechanical properties thereof.

Specifically, a PVC resin having a K-value of greater than 84 is an ultra-high molecular weight resin and refers to a homopolymer polymerized by suspension polymerization. Such a PVC resin has a difficulty related to supply of raw materials for the homopolymer since substantially no products are produced using the homopolymer, and there is a concern of deterioration in processability of the homopolymer. Thus, the PVC resin having a K-value maintained within the above range has economic feasibility in terms of manufacturing cost and process and can realize excellent processability.

Specifically, the rigid IPVC pipe resin composition exhibiting excellent strength and hydrostatic pressure resistance includes: about 1 part by weight to about 3 parts by weight of a tin stabilizer (tin complex); about 3 parts by weight to about 10 parts by weight of an impact modifier; and about 1 part by weight to about 10 parts by weight of the methacrylate lubricant, based on 100 parts by weight of the PVC resin having a K-value from 72 to 84.

The tin stabilizer (tin complex) may be present in an amount of about 1 part by weight to about 3 parts by weight based on 100 parts by weight of the PVC resin. The tin stabilizer is a thermal stabilizer and serves to allow the PVC resin to maintain physical and chemical properties during processing and use of the PVC resin. If the amount of the tin stabilizer is less than about 1 part by weight, the rigid IPVC pipe resin composition can exhibit deterioration in workability, and if the amount of the tin stabilizer is greater than about 3 parts by weight, the tin stabilizer causes increase in production costs of the resin composition while providing insignificant effects in improvement of properties thereof, and the resin composition can suffer from deterioration in properties.

For example, the tin stabilizer may include tin mercaptoacetate compounds and tin disulfide, and can minimize pyrolysis during processing of the resin composition.

In addition, the tin stabilizer may be an organic tin stabilizer. The organic tin stabilizer may include butyl tin, octyl tin and methyl tin stabilizers, and can be used in extrusion of the PVC resin due to excellent heat resistance and transparency thereof. The organic tin stabilizer can collect hydrogen chloride (HCl) in an inactive state, and suppress generation of double bonds or suppress change due to external factors such as oxidation, light, and the like.

The impact modifier is present in an amount of about 3 parts by weight to about 10 parts by weight based on 100 parts by weight of the PVC resin.

The impact modifier is included in the PVC resin and thus serves to improve cleavage, tensile strength, compressive strength, flexural strength, and impact strength of the PVC resin. The impact modifier includes acrylic copolymers, chloride polyethylene (CPE), and the like.

For example, CPE can be mixed with the PVC resin to form an alloy, and realize impact resistance and high flexural strength due to excellent compatibility with the PVC resin. Further, an ethylene group of CPE can prevent UV aging.

If the amount of the impact modifier is less than about 3 parts by weight based on 100 parts by weight of the PVC resin, the impact modifier does not provide strength improving effects, and if the amount of the impact modifier is greater than about 10 parts by weight based on 100 parts by weight of the PVC resin, increase in effects of the impact modifier can be insignificant as compared with increase in the amount thereof. Thus, within the above range, the strength improving effects provided by the impact modifier can be easily realized.

The methacrylate lubricant is mixed with the PVC resin and thus serves to improve fluidity and moldability of the resin, and may be present in an amount of about 1 part by weight to about 10 parts by weight based on 100 parts by weight of the PVC resin.

The methacrylate lubricant can reduce a melting time of the PVC resin and processing temperature due to compressibility and flexibility of the methacrylate lubricant or organic compatibility with the PVC resin having a K-value from 72 to 84. In addition, since the methacrylate lubricant improves melt flowability of the PVC resin and thus reduces load applied to an extruder, even though the PVC resin having a K-value from 72 to 84 is used, the rigid pipe resin composition can be formed. Further, the methacrylate lubricant can minimize deterioration in mechanical properties of the PVC resin due to use of a plasticizer.

Furthermore, the methacrylate lubricant is mixed with the high-molecular weight PVC resin having a K-value from 72 to 84, and thus improves fusion properties of the PVC resin and increases melt strength of the molten resin, thereby enabling pipe extrusion of the PVC resin.

Specifically, if the amount of the methacrylate lubricant is less than about 1 part by weight based on 100 parts by weight of the PVC resin, there are problems in that melting of the resin can become fast, and that the resin can be carbonized inside an extruder cylinder or a mold since the resin can suffer from deterioration in thermal stability due to lack of compatibility of the methacrylate lubricant with the PVC resin.

In addition, if the amount of the methacrylate lubricant is greater than about 10 parts by weight based on 100 parts by weight of the PVC resin, there are problems in that melting of the resin becomes slow, that the resin can exhibit deterioration in moldability since the PVC resin has increased viscosity due to increase in melting temperature of the resin, that the resin can exhibit deterioration in productivity and workability due to much high consumption, and that produced pipes can exhibit deterioration in hydrostatic pressure resistance.

Thus, within the above content range of the methacrylate lubricant, the PVC resin has improved compatibility, thereby easily realizing effective kneading of the composition.

The methacrylate lubricant may include butyl methacrylate and methyl methacrylate.

The methacrylate lubricant may include butyl methacrylate and methyl methacrylate in a weight ratio of about 1:1 to about 1:2.

If the weight ratio of butyl methacrylate to methyl methacrylate does not fall within this range, there is a concern of deterioration in compatibility of the methacrylate lubricant. Thus, within this range, there is an advantage in that the compatibility of the methacrylate lubricant can be maximized.

For example, when the methacrylate lubricant includes butyl methacrylate and methyl methacrylate in a ratio of 1:2 and maintains the weight ratio, since compatibility of the methacrylate lubricant with the PVC resin having a K-value from 72 to 84 is increased, kneading of the composition can be improved. In addition, since the weight ratio is maintained within the above range, the composition is subjected to melting (gelling) to a certain level or more upon extrusion, thus facilitating processing. Conversely, if the weight ratio does not fall within the above range, the composition can exhibit deteriorated processability due to the delay of melting thereof.

Specifically, when CPE mentioned above is used for the PVC resin as the impact modifier, butyl methacrylate can exhibit increased compatibility with the PVC resin; and methyl methacrylate, which is present in a larger amount than butyl methacrylate, can serve as a processing aid adjusting the melting temperature of the resin, and exhibits increased compatibility with the PVC resin due to use of CPE as the impact modifier. Thus, there can be an advantage in kneading of the composition.

Therefore, it is possible to produce a rigid IPVC pipe exhibiting excellent moldability, processability and physical strength using the methyl methacrylate lubricant maintaining the weight ratio.

Rigid IPVC Pipe

In accordance with another aspect of the present invention, a rigid IPVC pipe exhibiting excellent strength and hydrostatic pressure resistance is produced by extrusion of the above resin composition.

Details of the resin composition are as described above.

The pipe produced by extrusion of the resin composition may have a tensile strength from about 50 MPa to about 60 MPa. Tensile strength is one of values indicating mechanical strength of a material, and can be obtained using a load applied to the pipe and a deformed shape of the pipe when the pipe is pulled.

Specifically, since the resin composition includes a PVC resin having a K-value from 72 to 84, about 1 part by weight to about 3 parts by weight of a tin stabilizer (tin complex), about 3 parts by weight to about 10 parts by weight of an impact modifier, and about 1 part by weight to about 10 parts by weight of a methacrylate lubricant, based on 100 parts by weight of the PVC resin, the pipe can realize improved tensile strength and can also exhibit excellent falling weight impact strength and improved hydrostatic pressure resistance.

Hereinafter, the present invention will be described in more detail with reference to some examples. It should be understood that these examples are provided for illustration only and are not to be construed in any way as limiting the present invention.

A description of details apparent to those skilled in the art will be omitted for clarity.

EXAMPLES AND COMPARATIVE EXAMPLES

Example 1

A resin composition, which included a PVC resin having a K-value of 72; 2.5 parts by weight of a tin stabilizer (tin complex); 3.0 parts by weight of an acrylic copolymer (AIM) as an impact modifier; and 3.0 parts by weight of a lubricant, in which butyl methacrylate (BA) and methyl methacrylate (MMA) were mixed in a weight ratio of 1:1, based on 100 parts by weight of the PVC resin, was subjected to extrusion, thereby producing a pipe having a diameter of 114 mm and a thickness of 7.1 mm.

Example 2

A pipe was produced in the same manner as in Example 1 except that the resin composition included a PVC resin having a K-value of 76 and 4.0 parts by weight of the lubricant based on 100 parts by weight of the PVC resin.

Example 3

A pipe was produced in the same manner as in Example 1 except that the resin composition included a PVC resin having a K-value of 84 and 5.0 parts by weight of the lubricant based on 100 parts by weight of the PVC resin.

Example 4

A pipe was produced in the same manner as in Example 1 except that the resin composition included 10 parts by weight of a lubricant in which butyl methacrylate (BA) and methyl methacrylate (MMA) were mixed in a weight ratio of 1:2.

Comparative Example 1

A resin composition, which included a PVC resin having a K-value of 66; 2.1 parts by weight of a tin stabilizer (tin complex); 6.0 parts by weight of an acrylic copolymer (AIM) as an impact modifier; 1.0 part by weight of PA as a processing aid; and 1.6 parts by weight of an olefin lubricant based on 100 parts by weight of the PVC resin, was subjected to extrusion, thereby producing a pipe having a diameter of 114 mm and a thickness of 7.1 mm.

Comparative Example 2

A resin composition, which included a PVC resin having a K-value of 66; 4.5 parts by weight of a calcium-zinc (C-Z) stabilizer; 6.0 parts by weight of an acrylic copolymer (AIM) as an impact modifier; 1.0 part by weight of PA as a processing aid; and 1.6 parts by weight of an olefin lubricant based on 100 parts by weight of the PVC resin, was subjected to extrusion, thereby producing a pipe having a diameter of 114 mm and a thickness of 7.1 mm

TABLE 1

| | K-value of PVC resin (To 100) | Methacrylate lubricant (Parts by weight) (BA:MMA) |
|---|---|---|
| Example 1 | 72 | 3, (1:1) |
| Example 2 | 78 | 4, (1:1) |
| Example 3 | 84 | 5, (1:1) |
| Example 4 | 72 | 10, (1:2) |

TABLE 1-continued

|  | K-value of PVC resin (To 100) | Methacrylate lubricant (Parts by weight) (BA:MMA) |
|---|---|---|
| Comparative Example 1 | 66 | — (Olefin lubricant 1.6) |
| Comparative Example 2 | 66 | — (Olefin lubricant 1.6) |

<Experimental Example>—Evaluation of Mechanical Properties of Pipe

1) Tensile strength: Tensile strength of each of the pipes of Examples and Comparative Examples was measured using a tensile-compression tester (INSTROH 3369) in accordance with KS M ISO 6259-1 and 6259-2.

2) Falling weight height: Each of the pipes of Examples and Comparative Examples was secured to a floor, followed by dropping a 9 kg heavy cone-shaped weight onto the pipe from a certain height, thereby determining a height of the weight for breaking the pipe as a falling weight height. Here, as the falling weight height of the pipe is higher, the pipe exhibits better falling weight impact strength.

(Here, the test should be performed after the specimen is subjected to state adjustment at 0° C. for 60 minutes)

3) Hydrostatic pressure resistance: Hydrostatic pressure resistance of each of the pipes of Examples and Comparative Examples was measured using a long term hydrostatic pressure tester in accordance with KS M ISO 1167.

TABLE 2

|  | Tensile strength (MPa) | Falling weight height (m) | Hydrostatic pressure resistance (hr) |
|---|---|---|---|
| Example 1 | 51 | 5.0 or more | 13 |
| Example 2 | 55.4 | 4.0 or more | 55 |
| Example 3 | 52 | 5.0 or more | 60 |
| Example 4 | 53 | 5.0 or more | 23 |
| Comparative Example 1 | 48 | 2.0 | 1.0 |
| Comparative Example 2 | 47 | 1.6 | 1.0 |

As shown in Table 2, it was confirmed that the pipes of Examples 1 to 4 using the PVC resin having a K-value from 72 to 84 exhibited better tensile strength, falling weight impact strength and hydrostatic pressure resistance than the pipes of Comparative Examples 1 to 2 using the PVC resin having a K-value out of the range from 72 to 84.

In addition, despite attempts to produce the pipes from the compositions, in which the methacrylate lubricant was present in amounts of less than 1 part by weight and of greater than 10 parts by weight, respectively, there was a difficulty manufacturing the pipes due to deterioration in processability, mechanical properties, and the like.

Therefore, it was confirmed that, when the rigid PVC pipe was produced by extrusion of the PVC resin having a K-value from 72 to 84 without use of a plasticizer, the amount of the methacrylate lubricant had an influence on tensile strength, falling weight impact strength and hydrostatic pressure resistance of the PVC pipe.

The invention claimed is:

1. A rigid IPVC pipe resin composition, which exhibits excellent strength and hydrostatic pressure resistance, comprising:
a PVC resin having a K-value from 72 to 84; and
1 part by weight to 10 parts by weight of a methacrylate lubricant, based on 100 parts by weight of the PVC resin, wherein the methacrylate lubricant comprises a mixture of butyl methacrylate monomer represented by Formula (I) and methyl methacrylate monomer represented by Formula (II) in a weight ratio of 1:1 to 1:2, wherein the rigid IPVC pipe resin composition is free of a plasticizer,

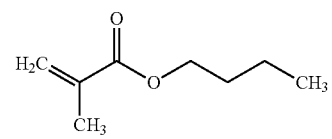

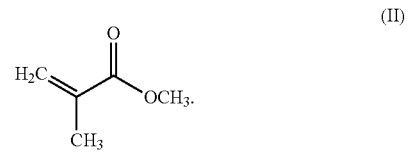

2. The resin composition according to claim 1, further comprising:
1 part by weight to 3 parts by weight of a tin stabilizer (tin complex);
3 parts by weight to 10 parts by weight of an impact modifier, based on 100 parts by weight of the PVC resin.

3. A rigid IPVC pipe, which exhibits excellent strength and hydrostatic pressure resistance, comprising:
a PVC resin having a K-value ranging from 72 to 84, and
1 part by weight to 10 parts by weight of a methacrylate based compound, based on 100 parts by weight of the PVC resin, wherein the methacrylate based compound comprises butyl methacrylate monomer represented by Formula (I) and methyl methacrylate monomer represented by Formula (II) in a weight ratio of 1:1 to 1:2, wherein the rigid IPVC pipe is free of a plasticizer, and wherein the rigid IPVC pipe has a tensile strength ranging from 50 MPa to 60 MPa,

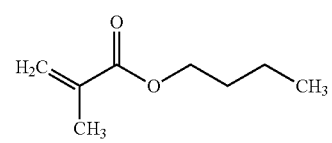

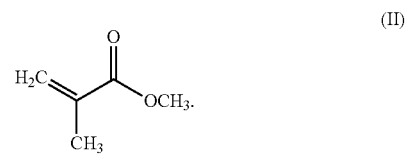

4. The resin composition according to claim 2, wherein the tin stabilizer comprises at least one selected from the group consisting of tin mercaptoacetate compounds and tin disulfide.

5. The resin composition according to claim 2, wherein the impact modifier comprises at least one selected from the group consisting of acrylic copolymers and chloride polyethylene.

6. The rigid IPVC pipe according to claim 3, further comprising:

1 part by weight to 3 parts by weight of a tin complex; and 3 parts by weight to 10 parts by weight of an impact modifier, based on 100 parts by weight of the PVC resin, wherein the impact modifier comprises chloride polyethylene.

7. The rigid IPVC pipe according to claim 6, wherein the tin complex comprises at least one selected from the group consisting of tin mercaptoacetate compounds and tin disulfide.

\* \* \* \* \*